United States Patent
Nori et al.

(10) Patent No.: US 12,360,768 B2
(45) Date of Patent: Jul. 15, 2025

(54) THROTTLING CODE FETCH FOR SPECULATIVE CODE PATHS

(71) Applicant: Intel Corporation, Santa Clara, CA (US)

(72) Inventors: Anant Vithal Nori, Bangalore (IN); Prathmesh Kallurkar, Bangalore (IN); Sreenivas Subramoney, Bangalore (IN); Niranjan Kumar Soundararajan, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 17/553,780

(22) Filed: Dec. 16, 2021

(65) Prior Publication Data

US 2023/0195464 A1 Jun. 22, 2023

(51) Int. Cl.
*G06F 9/38* (2018.01)

(52) U.S. Cl.
CPC .................. *G06F 9/3802* (2013.01)

(58) Field of Classification Search
CPC .... G06F 9/3802; G06F 9/3836; G06F 9/3806; G06F 9/3814; G06F 9/3842
See application file for complete search history.

(56) References Cited

U.S. PATENT DOCUMENTS

| | | | |
|---|---|---|---|
| 5,699,537 A * | 12/1997 | Sharangpani | G06F 9/3828 712/E9.046 |
| 5,809,268 A * | 9/1998 | Chan | G06F 9/3858 712/E9.049 |
| 6,049,866 A | 4/2000 | Earl | |
| 6,208,273 B1 | 3/2001 | Dye et al. | |
| 6,233,645 B1 * | 5/2001 | Chrysos | G06F 9/5016 712/E9.055 |
| 6,388,585 B1 | 5/2002 | Lacerda | |
| 6,505,293 B1 | 1/2003 | Jourdan et al. | |
| 6,625,723 B1 | 9/2003 | Jourday et al. | |

(Continued)

FOREIGN PATENT DOCUMENTS

| | | |
|---|---|---|
| CN | 103810297 A | 5/2014 |
| CN | 114661227 A | 6/2022 |

(Continued)

OTHER PUBLICATIONS

Examination report for European Application No. 22206038.6, issued Feb. 21, 2024, 8 pages.

(Continued)

*Primary Examiner* — Shawn Doman
(74) *Attorney, Agent, or Firm* — Nicholson De Vos Webster & Elliott LLP

(57) ABSTRACT

Methods and apparatus relating to throttling a code fetch for speculative code paths are described. In an embodiment, a first storage structure stores a reference to a code line in response to a request to be received from a cache. A second storage structure to store a reference to the code line in response to an update to an Instruction Dispatch Queue (IDQ). Logic circuitry controls additional code line fetch operations based at least in part on a comparison of a number of ongoing speculative code fetches and a determination that the code line is speculative. Other embodiments are also disclosed and claimed.

18 Claims, 8 Drawing Sheets

(56) References Cited

U.S. PATENT DOCUMENTS

| | | | |
|---|---|---|---|
| 6,862,662 B1 | 3/2005 | Cloud | |
| 6,879,266 B1 | 4/2005 | Dye et al. | |
| 7,519,796 B1* | 4/2009 | Golla | G06F 9/3854 |
| | | | 712/225 |
| 8,006,073 B1* | 8/2011 | Ali | G06F 9/3802 |
| | | | 712/220 |
| 8,447,948 B1 | 5/2013 | Erdogan et al. | |
| 8,738,860 B1 | 5/2014 | Griffin et al. | |
| 9,552,169 B2 | 1/2017 | Rappoport et al. | |
| 10,331,558 B2 | 6/2019 | Sazegari et al. | |
| 10,671,550 B1 | 6/2020 | Doi | |
| 11,625,349 B1* | 4/2023 | Randall | G06F 12/0862 |
| | | | 710/104 |
| 12,028,094 B2 | 7/2024 | Gaur et al. | |
| 2002/0124142 A1 | 9/2002 | Har et al. | |
| 2002/0174255 A1 | 11/2002 | Hayter et al. | |
| 2003/0084274 A1* | 5/2003 | Gaither | G06F 9/3842 |
| | | | 712/E9.05 |
| 2003/0088759 A1 | 5/2003 | Wilkerson | |
| 2003/0217251 A1 | 11/2003 | Jourdan et al. | |
| 2004/0010679 A1* | 1/2004 | Moritz | G06F 1/324 |
| | | | 713/1 |
| 2004/0039880 A1 | 2/2004 | Pentkovski et al. | |
| 2005/0160234 A1 | 7/2005 | Newburn et al. | |
| 2005/0289300 A1 | 12/2005 | Kim et al. | |
| 2006/0101238 A1* | 5/2006 | Bose | G06F 9/3802 |
| | | | 712/E9.055 |
| 2006/0294311 A1 | 12/2006 | Fu et al. | |
| 2007/0204135 A1* | 8/2007 | Jiang | G06F 9/3824 |
| | | | 712/E9.046 |
| 2008/0059765 A1* | 3/2008 | Svendsen | G06F 9/3856 |
| | | | 712/34 |
| 2008/0177984 A1 | 7/2008 | Lataille et al. | |
| 2008/0256345 A1* | 10/2008 | Bose | G06F 1/3203 |
| | | | 712/E9.055 |
| 2008/0282034 A1 | 11/2008 | Jiao et al. | |
| 2009/0150657 A1* | 6/2009 | Gschwind | G06F 9/3804 |
| | | | 712/E9.047 |
| 2010/0223237 A1 | 9/2010 | Mishra et al. | |
| 2011/0072213 A1 | 3/2011 | Nickolls et al. | |
| 2011/0208918 A1 | 8/2011 | Raikin et al. | |
| 2012/0089819 A1* | 4/2012 | Chaudhry | G06F 9/3854 |
| | | | 712/214 |
| 2013/0111605 A1 | 5/2013 | Maeda et al. | |
| 2013/0339706 A1* | 12/2013 | Greiner | G06F 9/3854 |
| | | | 712/244 |
| 2014/0095814 A1 | 4/2014 | Marden et al. | |
| 2014/0281240 A1 | 9/2014 | Willhalm | |
| 2014/0317377 A1 | 10/2014 | Ould-Ahmed-Vall et al. | |
| 2014/0372736 A1* | 12/2014 | Greenhalgh | G06F 9/3869 |
| | | | 712/239 |
| 2015/0106567 A1 | 4/2015 | Godard et al. | |
| 2015/0178202 A1 | 6/2015 | Sankaran et al. | |
| 2015/0178214 A1 | 6/2015 | Alameldeen et al. | |
| 2015/0378731 A1 | 12/2015 | Lai et al. | |
| 2016/0092373 A1 | 3/2016 | Doshi et al. | |
| 2016/0179676 A1 | 6/2016 | Engh-Halstvedt et al. | |
| 2016/0321076 A1 | 11/2016 | Satpathy et al. | |
| 2016/0321185 A1 | 11/2016 | Doshi et al. | |
| 2016/0328172 A1 | 11/2016 | Rappoport et al. | |
| 2017/0046164 A1* | 2/2017 | Madhavan | G06F 9/30101 |
| 2017/0161076 A1* | 6/2017 | Alapati | G06F 9/3851 |
| 2017/0199739 A1* | 7/2017 | Kitchin | G06F 12/0862 |
| 2017/0220475 A1 | 8/2017 | Bradbury et al. | |
| 2017/0249149 A1* | 8/2017 | Priyadarshi | G06F 9/30021 |
| 2017/0322811 A1* | 11/2017 | Abdallah | G06F 9/3804 |
| 2017/0371660 A1 | 12/2017 | Smith et al. | |
| 2018/0011796 A1 | 1/2018 | Guilford et al. | |
| 2018/0152201 A1 | 5/2018 | Gopal et al. | |
| 2018/0165097 A1 | 6/2018 | Hanley | |
| 2019/0034335 A1 | 1/2019 | Torre et al. | |
| 2019/0042354 A1 | 2/2019 | Coquerel et al. | |
| 2019/0044852 A1 | 2/2019 | Nolan et al. | |
| 2019/0034333 A1 | 6/2019 | Sazegari et al. | |
| 2019/0391869 A1 | 12/2019 | Gopal et al. | |
| 2020/0190807 A1 | 6/2020 | Header | |
| 2020/0249948 A1 | 8/2020 | Giamei et al. | |
| 2020/0272474 A1* | 8/2020 | Gabor | G06F 12/1027 |
| 2020/0285580 A1* | 9/2020 | Subramanian | G06F 13/1668 |
| 2021/0035258 A1 | 2/2021 | Ray et al. | |
| 2021/0072994 A1 | 3/2021 | Bainville et al. | |
| 2021/0103550 A1 | 4/2021 | Appu et al. | |
| 2021/0114495 A1 | 4/2021 | Battaglia et al. | |
| 2021/0312697 A1 | 10/2021 | Maiyuran et al. | |
| 2021/0374897 A1 | 12/2021 | Ray et al. | |
| 2022/0066931 A1 | 3/2022 | Ray et al. | |
| 2022/0091880 A1* | 3/2022 | Dutu | G06F 9/545 |
| 2022/0197643 A1 | 6/2022 | Gaur et al. | |
| 2022/0197659 A1 | 6/2022 | Gaur et al. | |
| 2022/0197794 A1 | 6/2022 | Kallurkar et al. | |
| 2022/0197799 A1 | 6/2022 | Gaur et al. | |
| 2022/0197813 A1 | 6/2022 | Gaur et al. | |
| 2022/0272569 A1 | 8/2022 | Berliner et al. | |
| 2022/0295345 A1 | 9/2022 | Trim et al. | |
| 2023/0019271 A1* | 1/2023 | Mukherjee | G06F 1/329 |

FOREIGN PATENT DOCUMENTS

| | | |
|---|---|---|
| CN | 114661359 A | 6/2022 |
| CN | 114661625 A | 6/2022 |
| CN | 115793960 A | 3/2023 |
| EP | 4020185 A1 | 6/2022 |
| EP | 4020223 A1 | 6/2022 |
| EP | 4020230 A1 | 6/2022 |
| EP | 4020231 A1 | 6/2022 |
| EP | 4149008 A1 | 3/2023 |
| EP | 4198749 A1 | 6/2023 |
| JP | H0922353 A | 1/1997 |
| WO | 2020190799 A3 | 9/2020 |
| WO | 2020190807 A1 | 9/2020 |

OTHER PUBLICATIONS

Ayers et al., "Asmdb: understanding and mitigating front-end stalls in warehouse-scale computers," ISCA '19, Jun. 22-26, 2019, 12 pages.

Kanev et al., "Profiling a Warehouse-Scale Computer," ISCA'15, Jun. 13-17, 2015, 12 pages.

Reinman et al., "Fetch Directed Instruction Prefetching," Proceedings of the 32nd Annual International Symposium on Microarchitecture (MICRO-32), Nov. 1999, 12 pages.

European Patent Office communication regarding Intention to Grant for application No. 21197700.4, issued Jul. 30, 2024, 78 pages.

Notice of Allowance in U.S. Appl. No. 17/133,622, mailed Feb. 29, 2024, 8 pages.

Notice of Intent to Grant from the European Patent Office for application No. 21198710.2, issued Aug. 2, 2024, 87 pages.

Office Action issued for U.S. Appl. No. 17/133,624, mailed Mar. 4, 2024, 12 pages.

Decision to grant European patent for Application No. 21198841.5, Apr. 5, 2024, 2 pages.

European Examination Report, application No. 21198874.6, Oct. 23, 2023, 7 pages.

European Patent Office, Notice of Grant for Application No. 21198841.5, issued Dec. 14, 2023, 80 pages.

Examination report issued by the European Patent Office for Application No. 21198874.6-1203, issued Jan. 19, 2023, 6 pages.

Extended European Search Report issued on Mar. 16, 2022 for EP Application No. 21198874.6.

European Examination report for application No. 22188197.2, issued Aug. 28, 2024, 6 pages.

Intention to Grant Notice issued by the European Patent Office for application No. 22206038.6, issued Jul. 8, 2024, 52 pages.

Notice of Intention to Grant for European Patent Application No. 21198710.2, issued Aug. 2, 2024, 89 pages.

Abail, et al. "Data Compression Accelerator on IBM POWER9 and z15 Processors," ISCA 2020, 14 pages.

Cao et al. "Characterizing, Modeling, and Benchmarking RocksDB Key-Value Workloads at Facebook," FAST 2020, retrieved from https://b;log.acolyer.org/2020/03/11/rocks-db-at-facebook/ on Nov. 19, 2020, 12 pages.

(56) References Cited

OTHER PUBLICATIONS

Colyer, Adrian, "Software-defined far memory in warehouse scale computers," The Morning Paper, 13 pages, May 22, 2019.

Lagar-Cavilla et al. "Software-Defined Far Memory in Warehouse-Scale Computers," ASPLOS 2019, retrieved from https://blog.acolyer.org/2019/05/22/sw-far-memory/ on Nov. 19, 2020, 11 pages.

Lagar-Cavilla, Andres, et al. "Software-Defined Far Memory in Warehouse-Scale Computers," Session: VM/Memory, ASPLOS '19, Apr. 13-17, 2019, Providence, Rhode Island, pp. 317-330.

Zswap, The Linux Kernel documentation, Linux Memory Management Documentation, retrieved from www.kernel.org/doc/html/latest/vm/zswap.html on Aug. 29, 2021.

Final Office Action issued in U.S. Appl. No. 17/133,618, issued Jun. 28, 2024, 17 pages.

Non-Final Office Action from U.S. Appl. No. 17/133,618, mailed Mar. 15, 2024, 18 pages.

Non-final Office Action issued in U.S. Appl. No. 17/133,615 on Feb. 15, 2024, 16 pages.

Non-Final Office Action for U.S. Appl. No. 17/470,089, mailed Sep. 25, 2024, 13 pages.

Andreas Abel et al., Reverse Engineering of Cache Replacement Policies in Intel Microprocessors and Their Evaluation, 2014 IEEE International Symposium on Performance Analysis of Systems and Software (ISPASS), 3 pages.

Andreas Abel et al., Measurement-based Modeling of the Cache Replacement Policy, 2013 IEEE 19th Real-Time and Embedded Technology and Applications Symposium (RTAS), 10 pages.

Glenn Reinmany et al., Fetch Directed Instruction Prefetching. International Symposium on Microarchitecture (MICRO-32), Nov. 1999, 12 pages.

Pepe Vila et al., CacheQuery: learning replacement policies from hardware caches, 2020 ACM SIGPLAN Conference on Programming Language Design and Implementation, 17 pages.

Extended European search report for application No. 22206038.6, issued May 12, 2023, 12 pages.

Extended European Search Report for application No. 22188197.2-1224, issued Feb. 3, 2023, 10 pages.

Extended European Search Report issued on Apr. 7, 2022 for EP Application No. 21198710.2.

Extended European Search Report issued on Mar. 1, 2022 for EP Application No. 2119770.4.

Extended European Search Report issued on Mar. 1, 2022 for EP Application No. 21198841.5.

Final Office Action issued in U.S. Appl. No. 17/133,624, Aug. 27, 2024, 16 pages.

Non-final office action in U.S. Appl. No. 17/551,172, mailed Feb. 13, 2025, 9 pages.

Non-Final Office Action issued in U.S. Appl. No. 17/133,618, mailed Jan. 24, 2025.

\* cited by examiner

| FE BF Result | IDQ BF Result | Decision | Notes |
|---|---|---|---|
| MISS | MISS | Non-Speculative | Cold |
| HIT | HIT | Non-Speculative | IDQ Hit => Likely retiring |
| HIT | MISS | Speculative | Seen in FE (not cold), but not in IDQ (unlikely to retire) |
| MISS | HIT | Speculative | Unlikely case |

THROTTLING CODE FETCH FOR SPECULATIVE CODE PATHS

FIELD

The present disclosure generally relates to the field of computer processors. More particularly, an embodiment relates to throttling a code fetch for speculative code paths.

BACKGROUND

Modern processors use highly sophisticated mechanisms to predict future control flows in a program. They rely on these mechanisms to fetch code segments that are predicted to execute in the future. Fetching "predicted" future code paths a priori delivers performance gains. This is, in part, due to the feature's impact of hiding the latency of fetching code segments from the more distant caches/memory if they were to miss in a dedicated code cache.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
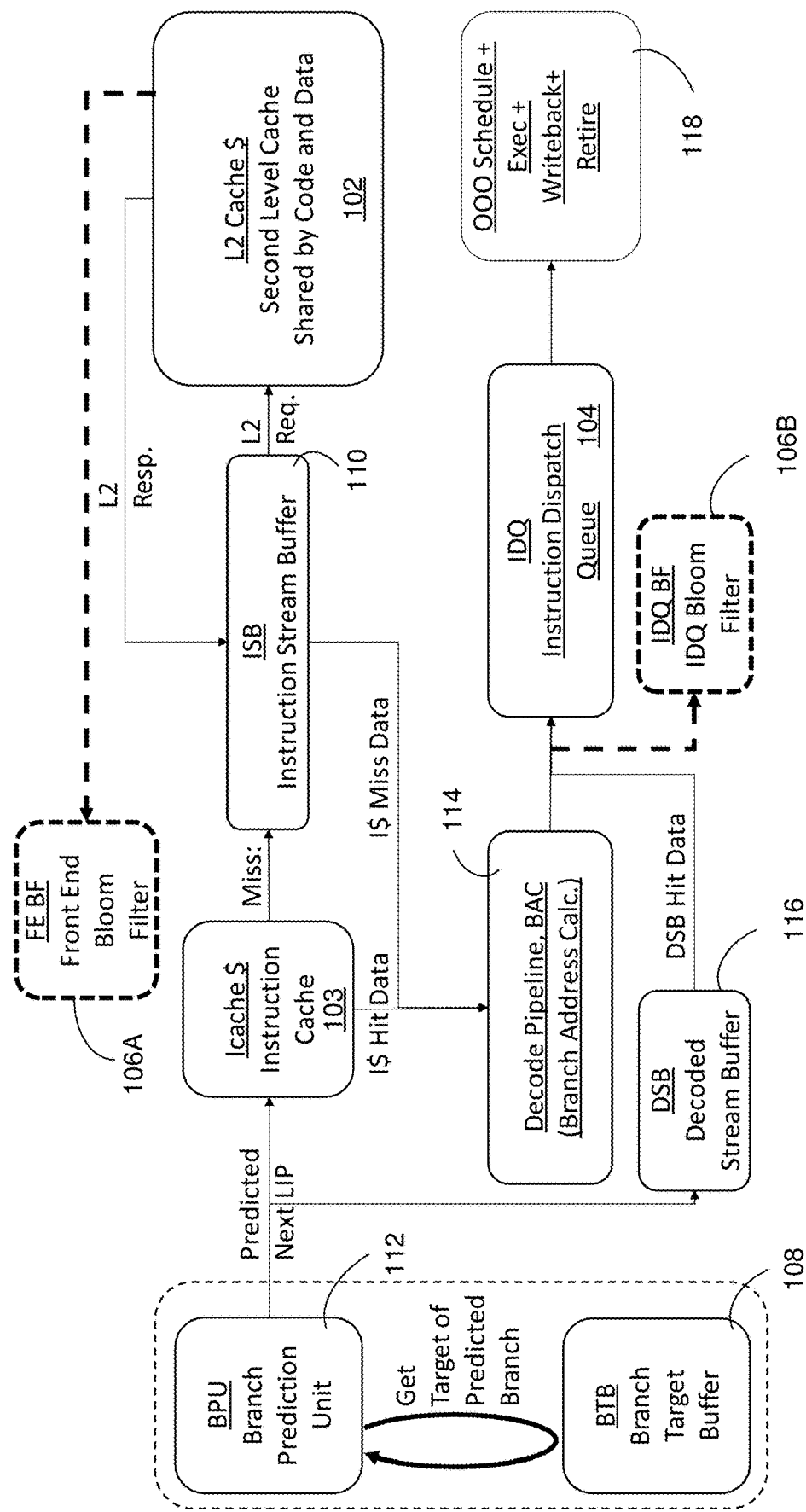
FIG. 1 illustrates a block diagram of various sample components of a processor's front end, in accordance with an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, fetching "predicted" future code paths a priori delivers performance gains. This is, in part, due to the feature's impact of hiding the latency of fetching code segments from more distant caches/memory if they were to miss in a dedicated code cache. However, this feature can also end up fetching a large number of speculative code segments (e.g., where these code segments are fetched from Dynamic Random-Access Memory (DRAM) or distant on-chip caches) that may be rarely executed. Further, a processor can generally evict a large number of frequently useful code/data segments to store these potentially less-needed speculative code segments. This can cause a performance loss in modern processors.

Hence, injudiciously eliminating or reducing future code fetches can lead to performance losses. For example, approximately a 0.5% loss (with outliers of up to 5%) can be seen if the number of Instruction Stream Buffer (ISB) entries (or the maximum outstanding code fetches) are halved.

To this end, some embodiments provide one or more techniques for throttling a code fetch for speculative code paths. In an embodiment, future code line fetches are throttled only for speculative code paths. As discussed herein, a "code line" generally refers to a cache line (e.g., in a Level 2 (L2) cache or other caches) that stores an instruction or a micro-operation. Also, as will be further discussed herein, one or more embodiments can reduce the number of uncore reads by approximately 13% and deliver performance gains of approximately 0.7% (with positive outliers of up to approximately 4.5%) for a suite of large code footprint workloads.

By contrast, an increased transistor budget may be used for a processor front end to store additional speculative code paths. Generally, a processor fetches speculative code paths because its front end can mispredict. The problem of fetching speculative code paths persists even in newer processors with large, sophisticated front end structures. This is, in part, because modern workloads with deep software stacks exhibit code footprints in tens of megabytes. The control flow information for such large code segments overwhelms smaller caches and buffers employed in such front ends.

An embodiment throttles a processor's front end (FE) when the FE fetches cache lines for speculative code paths by:

(1) A mechanism (e.g., logic) to determine/predict if a code access is cold, speculative, or non-speculative. This mechanism tracks code accesses in the front end (e.g., a miss in the ICache (or Instruction Cache which is interchangeably referred to as "I$" herein)) and pre-execution stage (at IDQ or Instruction Dispatch Queue, see, e.g., discussion of IDQ 104 below). Misses in both structures indicate a cold access and is conservatively treated as non-speculative. It is also observed whether code lines that reach the pre-execution IDQ stage are highly likely to be non-speculative. This is likely due to the fact that speculative code due to Branch Target Buffer (BTB) misses/aliasing are cleared by this stage. Code accessed by the front end (I$ lookup earlier) but not by the IDQ is considered speculative.

(2) Disallowing the front end from fetching a code line that misses the I$ when the number of ongoing speculative code fetches exceeds a threshold value (e.g., two). In an embodiment, logic circuitry (e.g., in a processor front end) controls additional code line fetch operations based at least in part on a comparison of a number of ongoing speculative code fetches and a determination that the code line is speculative. For example, the ISB 110 may disallow further fetching by the FE on the speculative path once the ISB detects a threshold of "predicted" speculative lines held. The ISB may signal to the blocks earlier in the pipeline (e.g., primarily the BPU 112) that it is "full". This stalls the pipeline before the ISB block, since the pipeline generally operates in order (e.g., fetch is in order). Similarly, when an existing speculative line in the ISB 110 receives return bytes from a Mid-Level Cache (MLC) or L2 Cache 102 (or beyond) and the ISB entry is deallocated, then the ISB occupancy for speculative lines drops below the threshold value. Hence, the ISB stops signaling this "full" condition to the blocks in the pipeline before it and the fetching stoppage is unblocked. Moreover, the FE pipeline generally becomes stalled for anything that misses the instruction cache 103. If subsequent fetches by the BPU 112 hit in the instructions cache 103, they are allowed to proceed until allocation in the IDQ 104. Any miss in the Instruction Cache 103, that is predicted as speculative/non-retiring, is stalled.

As a result, some embodiments may reduce L2 code read operations by approximately 13% and a code footprint installed in a code cache by approximately 18% (which improves I$ hit-rate by approximately 1.5%). Reducing L2 code read operations also reduces energy consumption.

Moreover, some processors may fetch a large amount of code lines that are rarely or never used. Fundamentally, this is because the core's front end needs to be de-coupled from the execution units and run ahead of it. This run ahead is important for performance as it ensures an uninterrupted stream of instructions to the execution units (i.e., there is no performance loss when there are no instructions to execute). Since all programs have control-flow, the front end run ahead is inherently speculative (i.e., the control flow instructions in the front end are significantly ahead of execution units resolving them and hence the front end needs to speculate on the outcome of the control flow and fetch further instructions ahead).

Figure 4:
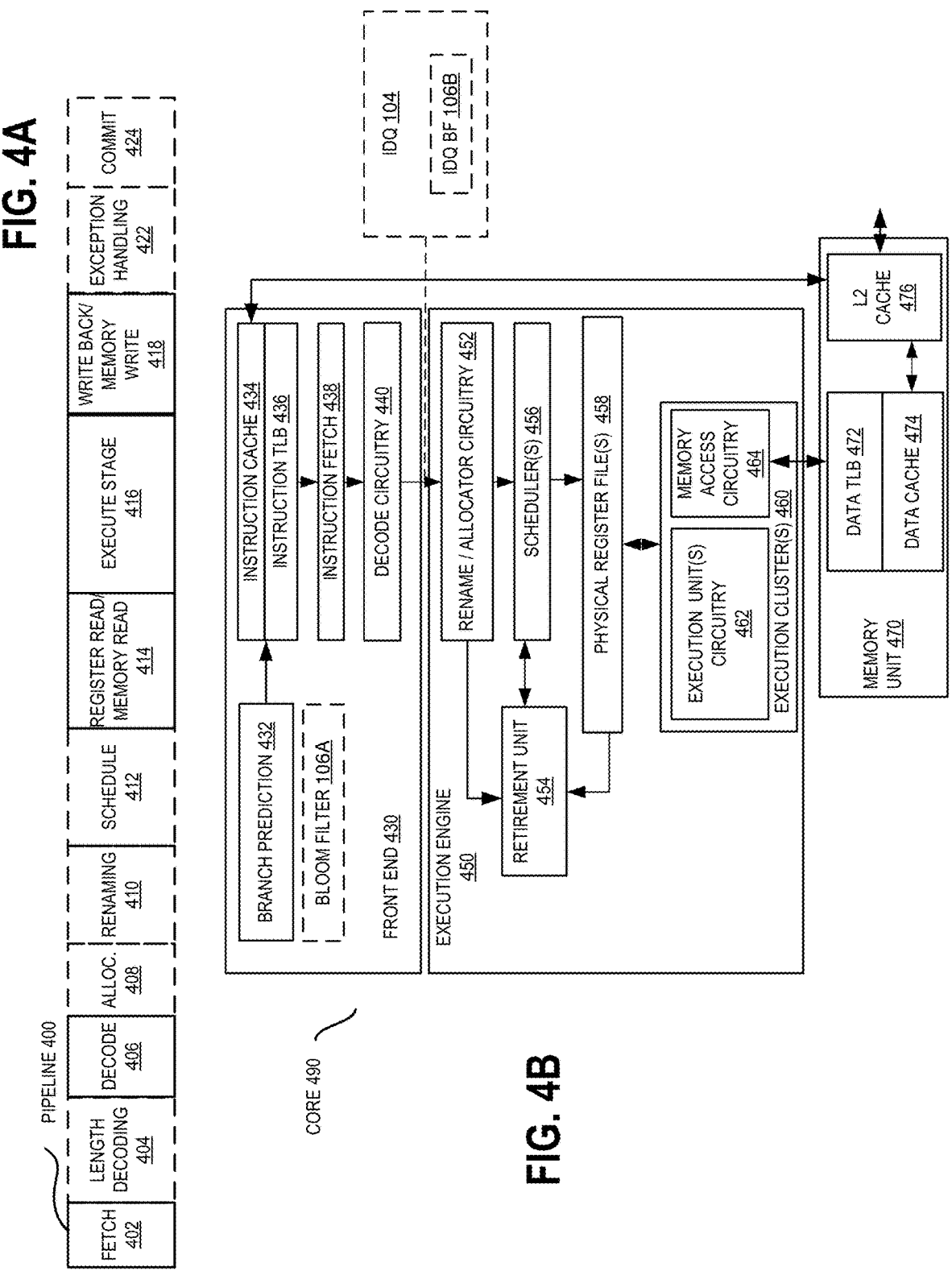
FIG. 4A is a block diagram illustrating both an exemplary in-order pipeline and an exemplary register renaming, out-of-order issue/execution pipeline according to embodiments.
FIG. 4B is a block diagram illustrating both an exemplary embodiment of an in-order architecture core and an exemplary register renaming, out-of-order issue/execution architecture core to be included in a processor according to embodiments.

FIG. 1 illustrates a block diagram of various sample components of a processor's front end, in accordance with an embodiment. The arrows in FIG. 1 indicate in what direction information/data flows across the sample front end components of the processor. Speculation in the front end results in code bytes that are fetched in the L2 cache 102 (which may be the same as or similar to L2 cache 476 of FIG. 4B) and Level 1 (L1) instruction cache(s) 103 (which may be the same as or similar to instruction cache 434 of FIG. 4B) that are never executed. This impacts both performance (e.g., precious cache capacity consumed by speculative code lines) and power (e.g., unnecessary speculative non-executed code bytes fetched from the L2 (or beyond) and filled into the L2 and I$).

As shown in FIG. 1, some embodiments add two Bloom Filters (BFs) for each processor core: a front end BF 106A and an IDQ BF 106B. The front end BF 106A and IDQ BF 106B track (or store an indicia corresponding to) code cache lines that have been accessed by processor's front end and IDQ logic 104, respectively.

As discussed herein, a "Bloom filter" generally refers to a data/storage structure or storage unit (such as those discussed herein with reference to FIGS. 1 and 4A-8) used for holding state (in an embodiment, each bit of the Bloom filter stores and/or denotes a block of 128B (Bytes) which has reached the IDQ 104). Bloom filters are generally used to store an approximate state. Because a Bloom filter stores an approximate state, the size of a Bloom filter is relatively smaller—and hence Bloom filters are attractive to utilize in hardware solutions.

Referring to FIG. 1, the front end Bloom filter 106A is updated when a code line request is received from the L2 cache 102. That code line's virtual address is added in the Bloom filter 106A. The primary function of this structure is to track all code lines seen. This helps identify cold (e.g., never seen before) lines that can be conservatively treated as non-speculative. In an embodiment, the front end Bloom filter 106A contains four tables of 2 KB each where each table tracks virtual addresses at a granularity of 512 bytes. The use of four tables is part of a Bloom filter design; namely, each table may be accessed with a different hash function. The use of multiple hashes reduces the number of false positives in a Bloom filter.

Moreover, the IDQ Bloom filter 106B is updated when an instruction is pushed in the IDQ 104 (which is a queue holding instructions in a pre-execution stage). The primary function of this structure is to identify lines that reach this stage and treat them as likely non-speculative. This is due to the fact that speculative code due to Branch Target Buffer (BTB) 108 misses/aliasing are cleared by this stage. Specifically, the virtual address of instructions that are pushed in to the IDQ are tracked in the IDQ BF 106B. In an embodiment, the IDQ Bloom filter 106B contains 4 tables of 2 KB each where each table tracks virtual addresses at a granularity of 128 bytes.

To enforce restricted run-ahead, at the time of allocating an entry in an ISB 110 (which may function such as a code cache's Miss Status Handling Register (MSHR)), it can be predicted whether instructions from this line are ever going to be executed. In an embodiment, MSHR holds the request that missed in code L1 cache and is responsible for filling back into code L1 cache once it receives data from the L2 cache. If the prediction is that the line's instructions may never execute, it can be deemed as speculative. The speculative lines are allowed to allocate an ISB entry only when the current number of outstanding ISB entries for speculative lines is less than or equal to N (e.g., N=2).

Additionally, Branch Prediction Unit (BPU) 112 is responsible for predicting the control flow of the program (branch taken or not taken). This allows the front end to run ahead of execution. BPU 112 may be the same as or similar to Branch Prediction 432 in FIG. 4B and/or part of Fetch 402 in FIG. 4A. Block 118 can perform various Out-Of-Order (OOO) scheduling, execution and writeback/retire, which may perform the operations discussed with reference to schedule 412, execute stage 416, writeback/memory write 418, commit 424 of FIG. 4A and/or the scheduler 456, execution clusters 460, and retirement unit 454 of FIG. 4B.

Further, Branch Target Buffer (BTB) 108 is a structure that stores the target of a branch when it is predicted as taken. BTB 108 may be part of Branch Prediction 432 in FIG. 4B and/or part of Fetch 402 in FIG. 4A. Decode Pipeline and Branch Address Calculator (BAC) 114 refers to a pipeline that converts/decodes raw code bytes into instructions and may include Instruction Length Decode for Complex Instruction Set Computing (CISC) x86, and may be the same to or similar to Length Decoding 404 and/or Decode in FIG. 4A. This stage may be absent in Reduced Instruction Set Computing (RISC) architectures. Instruction decode and branch address calculation may be used for determining (not predicting) the target of a taken branch instruction.

Moreover, Decoded Stream Buffer (DSB) 116 is a cache that stores pre-decoded code bytes as instructions (which may sometimes be referred to as micro-operation or micro-op cache). A hit in the DSB 116 means that there is no need to go through the Decode Pipeline (114). Out-Of-Order (OOO) Schedule and Execution logic 118 is the OOO scheduler and execution and retire portion of the core pipeline (which may be the same as or similar to Allocation block 408 onwards in FIG. 4A and Execution Engine 450 in FIG. 4B.

Figures 2A, 2B:
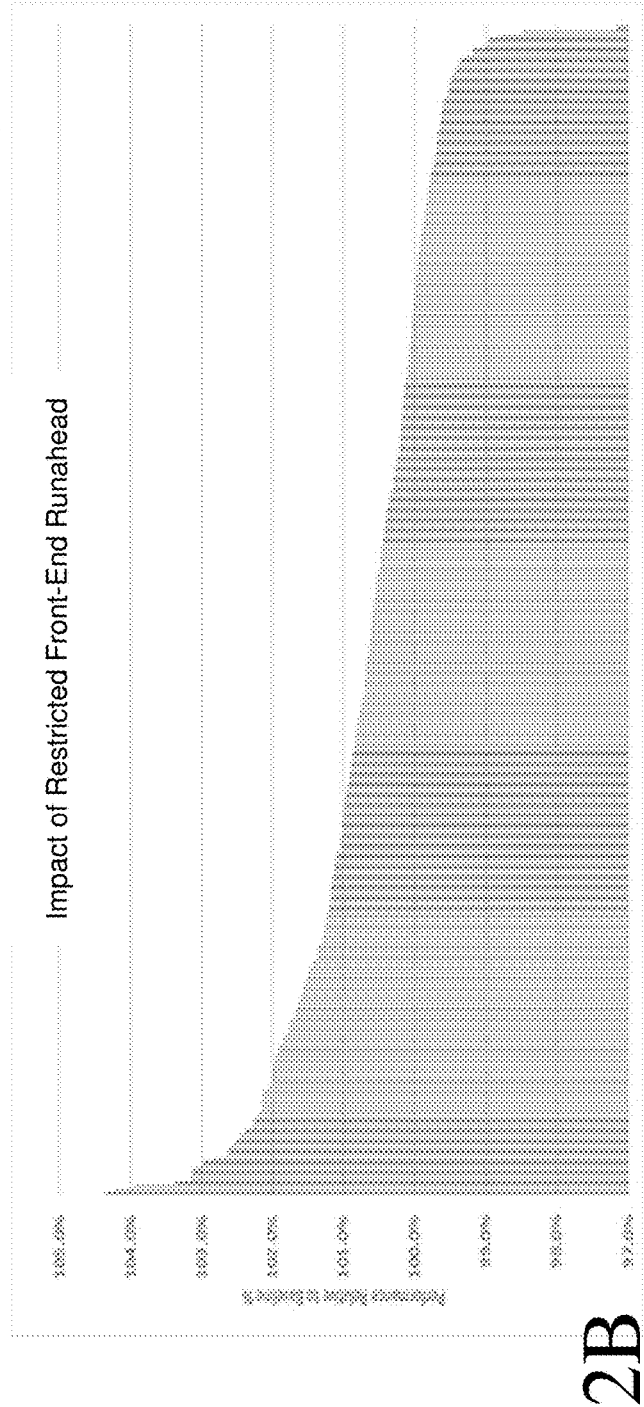
FIG. 2A illustrates a table with identification information for speculative code cache lines, according to an embodiment.
FIG. 2B illustrates a graph of sample impact of restricted run-ahead on performance of large code footprint workloads, according to some embodiments.

FIG. 2A illustrates a table 200 with identification information for speculative code cache lines, according to an embodiment. In one embodiment, the information shown in table 200 is derived by using the two Bloom filters 106A and 106B discussed with reference to FIG. 1.

Referring to FIGS. 1 and 2A, the ISB 110 tracks the number of speculative lines (e.g., limited to two speculative lines in an embodiment). In turn, a speculative tag can be assigned to a code cache line before allocation in the ISB 110. As shown in FIG. 2A, a cache line can be predicated as speculative if its virtual address is: (a) present in the front end Bloom filter 106A but absent in the IDQ Bloom filter 106B (in part because this condition indicates that the line was fetched in the past but not executed)—this condition may be repeated; and/or (b) absent in the front end Bloom filter 106A but present in the IDQ Bloom filter 106B (in part because every instruction that reaches the IDQ 104 passes through the front end of the processor, since a probable reason for such a condition is an aliasing issue with IDQ Bloom filter 106B).

FIG. 2B illustrates a graph 250 of a sample impact of restricted run-ahead on performance of large code footprint workloads, according to some embodiments. More particularly, FIG. 2B illustrates the impact of at least one embodiment over a suite of large code footprint workloads. The baseline system mimics a server processor. Over a suite of 382 workloads, an embodiment is capable of increasing performance by approximately 0.7% (geometric mean) and/or reducing the amount of code footprint installed in code cache by approximately 18%. As a result, code cache hit-rate may improve on average by approximately 1.5%.

Accordingly, one or more embodiments can reduce the number of uncore reads by approximately 13% and deliver performance gains of approximately 0.7% (with positive outliers of up to approximately 4.5%) for a suite of 382 important client and server workloads.

Figure 3:
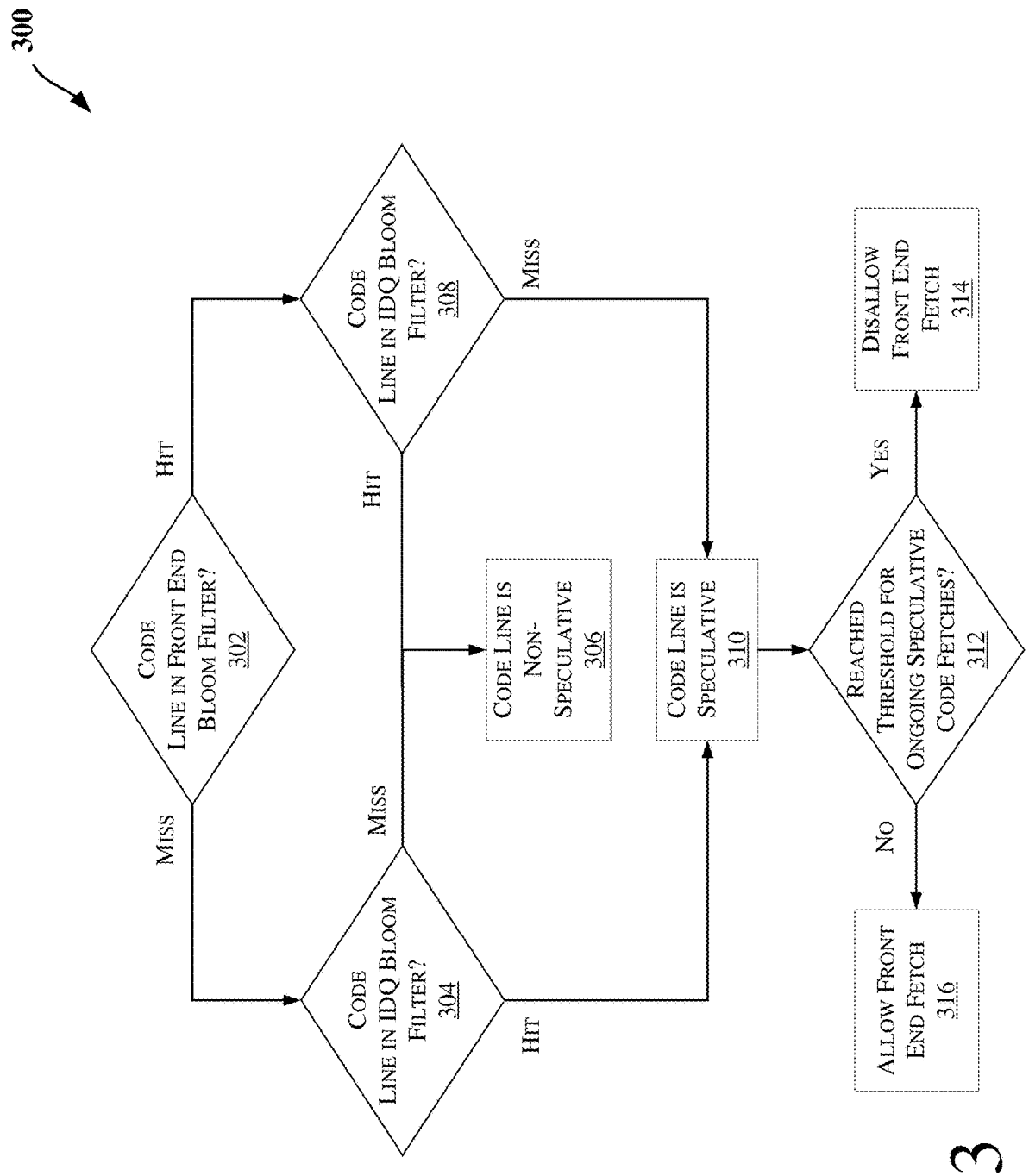
FIG. 3 illustrates a flow diagram of a method to throttle code fetches for speculative code paths, according to an embodiment.

FIG. 3 illustrates a flow diagram of a method 300 to throttle code fetches for speculative code paths, according to an embodiment. One or more of the operations of the method 300 may be performed by one or more components of FIGS. 1, 2, and 4A-8, such as a processor, processor core, or other logic circuitry within a processor or processor core.

Referring to FIGS. 1, 3A, and 4A-4B, at an operation 302, when a code line (e.g., the code line's virtual address) is absent from the front end Bloom filter 106A, an operation 304 determines whether the code line (e.g., the code line's virtual address) is present from the IDQ Bloom filter 106B. If the code line is absent from the IDQ Bloom filter 106B, an operation 306 determines that the code line is cold (or non-speculative as discussed above).

As mentioned above with reference to FIG. 2A, the front end Bloom filter 106A is updated when a code line request is received from the L2 cache 102. That code line's virtual address is added in the Bloom filter 106A. Also, the IDQ Bloom filter 106B is updated when an instruction is pushed in the IDQ 104 (which is a queue holding instructions in pre-execution stage).

If operation 302 returns a hit, an operation 308 determines whether the code line is present in the IDQ Bloom filter 106B. If operation 308 returns a hit, method 300 resumes at operation 306 and the code line is determined to be non-speculative. However, if operation 308 returns a miss, an operation 310 determines the code line as speculative. As shown in FIG. 3, if operation 304 returns a hit, operation 310 determines the code line as speculative.

While the embodiment shown in FIG. 3 may consider the presence of the code line in the front end Bloom filter 106A before the IDQ Bloom filter 106B, embodiments are not limited to this and these operations may be reversed while maintaining the same results shown in the table 200 of FIG. 2A.

At an operation 312, it is determined whether a threshold value (e.g., two in an embodiment) for ongoing speculative code fetches in the front end of the processor has been reached. If the threshold value has been reached, operation 314 disallows further front end fetches for code lines that miss in the I$ 103 of FIG. 1. However, if the threshold value has not been reached at operation 312, operation 316 allows (or otherwise does not block) further front end fetches for code lines that miss in the I$ 103 of FIG. 1.

Additionally, some embodiments may be applied in computing systems that include one or more processors (e.g., where the one or more processors may include one or more processor cores), such as those discussed with reference to FIG. 1A et seq., including for example a desktop computer, a work-station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 4A is a block diagram illustrating both an exemplary in-order pipeline and an exemplary register renaming, out-of-order issue/execution pipeline according to embodiments. FIG. 4B is a block diagram illustrating both an exemplary embodiment of an in-order architecture core and an exemplary register renaming, out-of-order issue/execution architecture core to be included in a processor according to embodiments. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a writemask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 4) the memory unit 470 and the physical register file(s) unit(s) 458 perform the write back/memory write stage 418; 4) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

Figure 5:
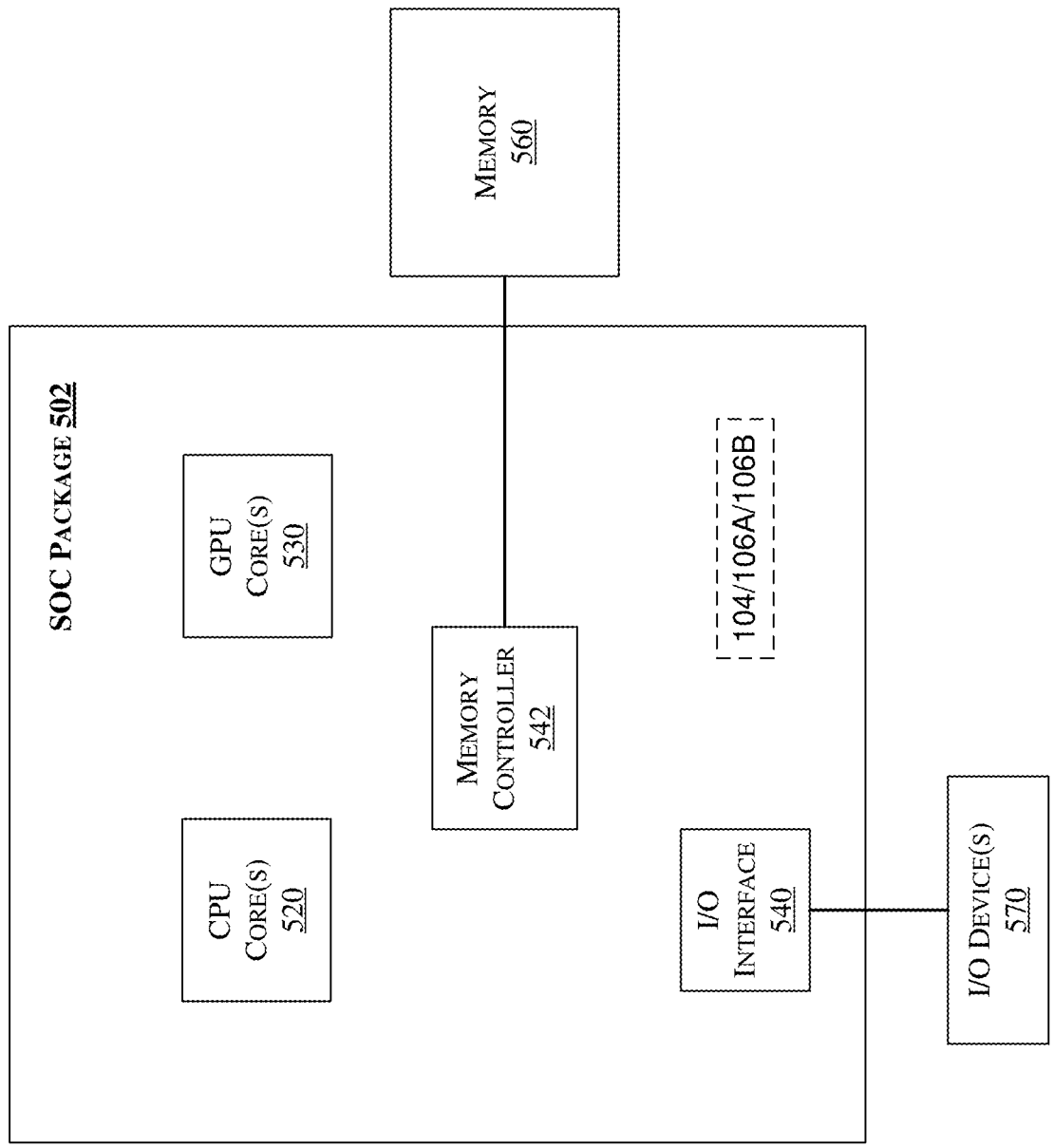
FIG. 5 illustrates a block diagram of an System On Chip (SOC) package in accordance with an embodiment.

FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 502 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like.

Figure 6:
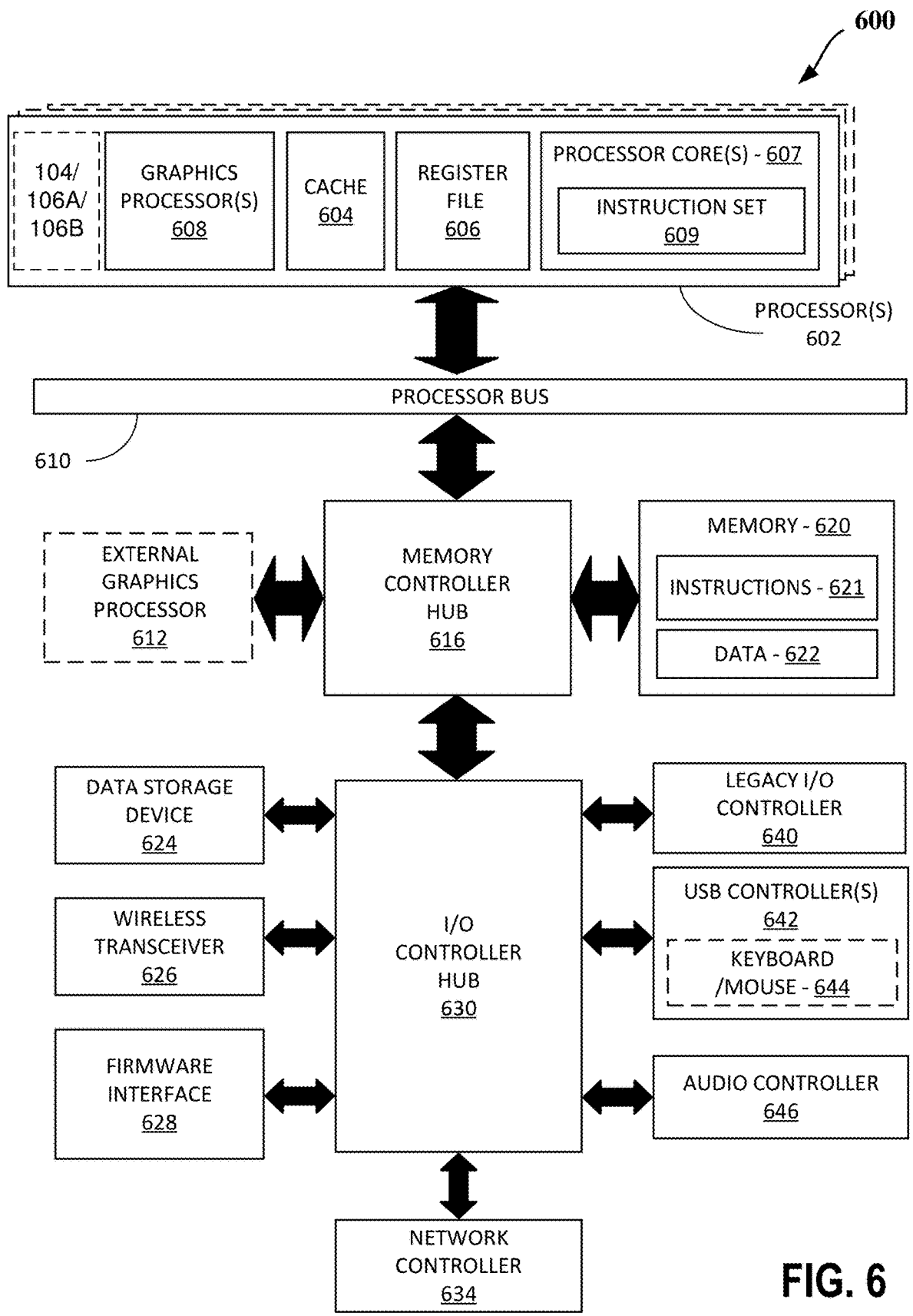
FIG. 6 is a block diagram of a processing system, according to an embodiment.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level 3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
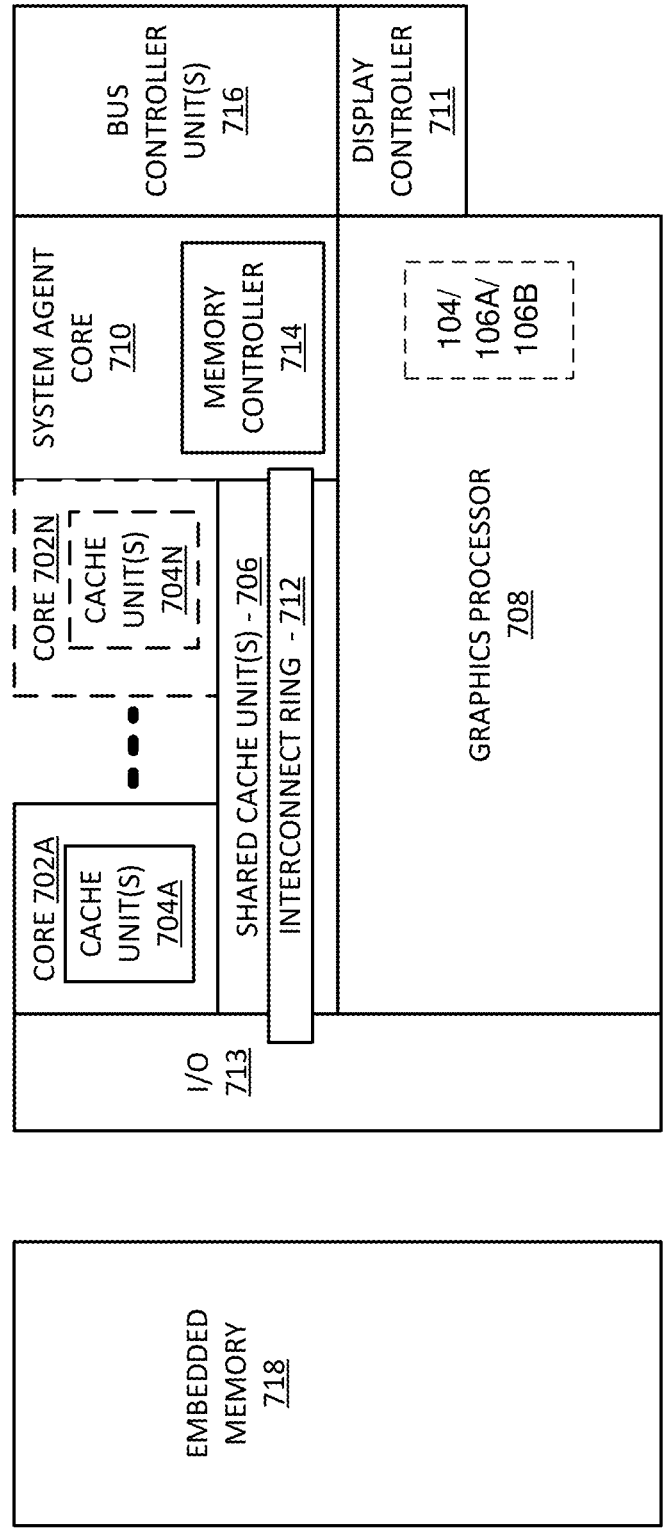
FIG. 7 is a block diagram of an embodiment of a processor having one or more processor cores, according to some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multithreading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
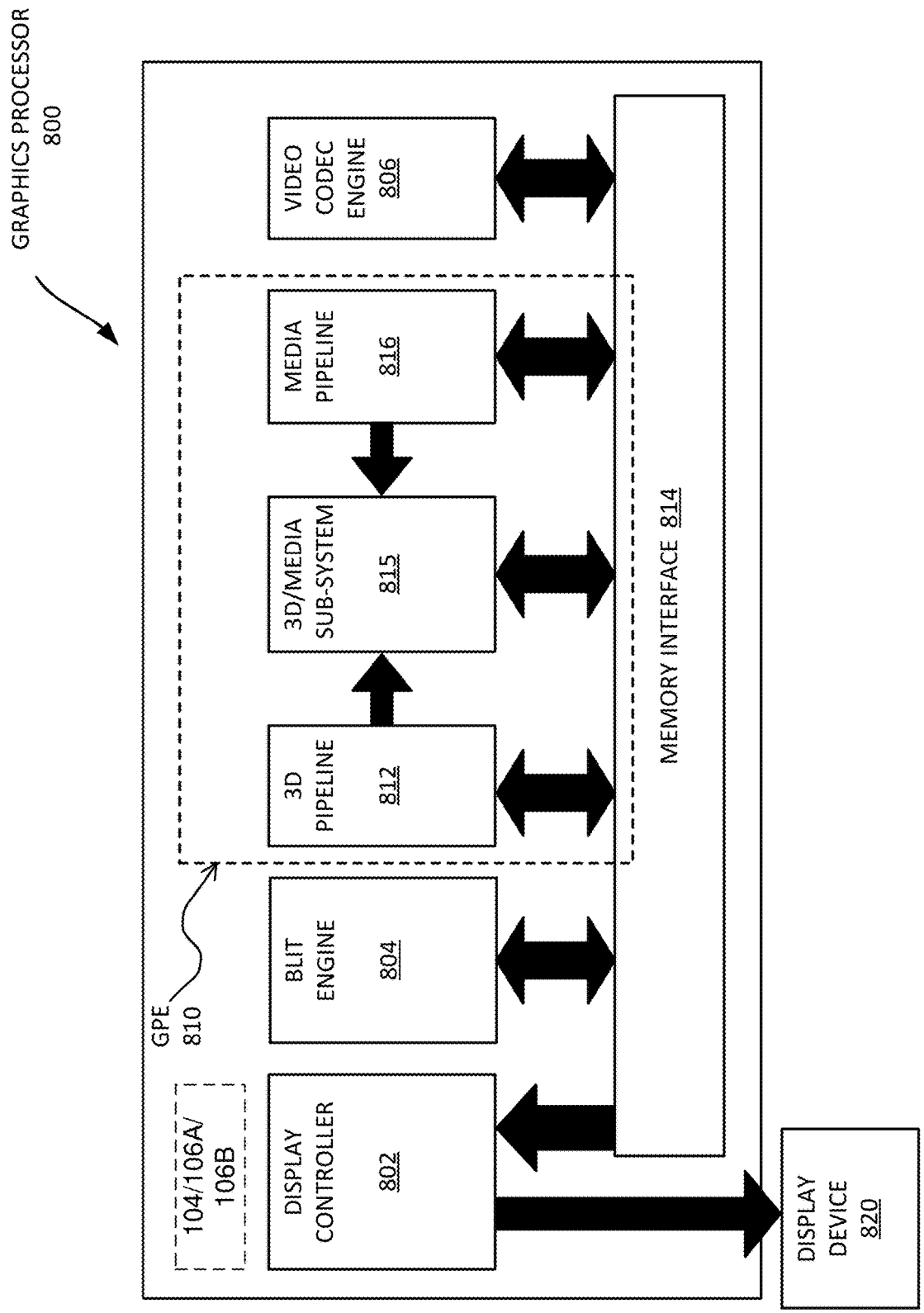
FIG. 8 is a block diagram of a graphics processor, according to an embodiment.

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 3D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media subsystem 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: a first storage structure to store a reference to a code line in response to a request to be received from a cache; a second storage structure to store a reference to the code line in response to an update to an Instruction Dispatch Queue (IDQ); and logic circuitry to control additional code line fetch operations based at least in part on a comparison of a number of ongoing speculative code fetches and a determination that the code line is speculative. Example 2 includes the apparatus of example 1, wherein the logic circuitry is to disallow the additional code line fetch operations based at least in part on a determination that the number of ongoing speculative code fetches has reached a threshold value and the determination that the code line is speculative. Example 3 includes the apparatus of example 2, wherein the code line is speculative in response to one of: (a) a hit in the first storage structure for the code line and a miss in the second storage structure for the code line; and (b) a hit in the second storage structure for the code line and a miss in the first storage structure for the code line. Example 4 includes the apparatus of example 1, wherein the logic circuitry is to allow the additional code line fetch operations based at least in part on a determination that the number of ongoing speculative code fetches has not reached a threshold value and the determination that the code line is speculative. Example 5 includes the apparatus of example 1, wherein the logic circuitry is to control the additional code line fetch operations for code lines that cause a miss in an instruction cache. Example 6 includes the apparatus of example 1, wherein the logic circuitry is to control the additional code line fetch operations based at least in part on the comparison of the number of ongoing speculative code fetches in a front end of a processor. Example 7 includes the apparatus of example 1, wherein the first storage structure comprises a front end Bloom filter. Example 8 includes the apparatus of example 1, wherein the second storage structure comprises an IDQ Bloom filter. Example 9 includes the apparatus of example 1, wherein the reference to the code line comprises a virtual address of the code line. Example 10 includes the apparatus of example 1, wherein the cache is a Level 2 (L2) cache. Example 11 includes the apparatus of example 1, wherein the second storage structure is to store an indicia of at least one of one or more instructions and one or more micro-operations that have been allocated in the IDQ. Example 12 includes the apparatus of example 11, wherein the IDQ is to store at least one of an instruction and a micro-operation to be allocated in a pre-execution stage of a processor pipeline. Example 13 includes the apparatus of example 1, wherein the code line is to store at least one of an instruction or a micro-operation. Example 14 includes the apparatus of example 1, wherein a processor, having one or more processor cores, comprises one or more of: the logic circuitry, the first storage structure, and the second storage structure.

Example 15 includes one or more non-transitory computer-readable media comprising one or more instructions that when executed on a processor configure the processor to perform one or more operations to cause: a first storage structure to store a reference to a code line in response to a request to be received from a cache; a second storage structure to store a reference to the code line in response to an update to an Instruction Dispatch Queue (IDQ); and logic circuitry to control additional code line fetch operations based at least in part on a comparison of a number of ongoing speculative code fetches and a determination that the code line is speculative. Example 16 includes the one or more computer-readable media of example 15, further comprising one or more instructions that when executed on the processor configure the processor to perform one or more operations to cause the logic circuitry to disallow the additional code line fetch operations based at least in part on a determination that the number of ongoing speculative code fetches has reached a threshold value and the determination that the code line is speculative. Example 17 includes the one or more computer-readable media of example 15, further comprising one or more instructions that when executed on the processor configure the processor to perform one or more operations to cause the code line to be considered as speculative in response to one of: (a) a hit in the first storage structure for the code line and a miss in the second storage structure for the code line; and (b) a hit in the second storage structure for the code line and a miss in the first storage structure for the code line. Example 18 includes the one or more computer-readable media of example 15, further comprising one or more instructions that when executed on the processor configure the processor to perform one or more operations to cause the logic circuitry to allow the additional code line fetch operations based at least in part on a determination that the number of ongoing speculative code fetches has not reached a threshold value and the determination that the code line is speculative. Example 19 includes the one or more computer-readable media of example 15, further comprising one or more instructions that when executed on the processor configure the processor to perform one or more operations to cause the logic circuitry to control the additional code line fetch operations for code lines that cause a miss in an instruction cache. Example 20 includes the one or more computer-readable media of example 15, further comprising one or more instructions that when executed on the processor configure the processor to perform one or more operations to cause the logic circuitry to control the additional code line fetch operations based at least in part on the comparison of the number of ongoing speculative code fetches in a front end of a processor.

Example 21 includes an apparatus comprising means to perform a method as set forth in any preceding example. Example 22 includes machine-readable storage including machine-readable instructions, when executed, to implement a method or realize an apparatus as set forth in any preceding example.

In various embodiments, one or more operations discussed with reference to FIG. 1A et seq. may be performed by one or more components (interchangeably referred to herein as "logic") discussed with reference to any of the figures.

In various embodiments, the operations discussed herein, e.g., with reference to FIG. 1A et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first storage structure to store a reference to a code line in response to a request to be received from a cache;
a second storage structure to store a reference to the code line in response to an update to an Instruction Dispatch Queue (IDQ); and
logic circuitry to control additional code line fetch operations based at least in part on a comparison of a number of ongoing speculative code fetches and a determination that the code line is speculative, wherein the code line is to be considered as speculative in response to one of: (a) a hit in the first storage structure for the code line and a miss in the second storage structure for the code line; and (b) a hit in the second storage structure for the code line and a miss in the first storage structure for the code line.

2. The apparatus of claim 1, wherein the logic circuitry is to disallow the additional code line fetch operations based at least in part on a determination that the number of ongoing speculative code fetches has reached a threshold value and the determination that the code line is speculative.

3. The apparatus of claim 1, wherein the logic circuitry is to allow the additional code line fetch operations based at least in part on a determination that the number of ongoing speculative code fetches has not reached a threshold value and the determination that the code line is speculative.

4. The apparatus of claim 1, wherein the logic circuitry is to control the additional code line fetch operations for code lines that cause a miss in an instruction cache.

5. The apparatus of claim 1, wherein the logic circuitry is to control the additional code line fetch operations based at least in part on the comparison of the number of ongoing speculative code fetches in a front end of a processor.

6. The apparatus of claim 1, wherein the first storage structure comprises a front end Bloom filter.

7. The apparatus of claim 1, wherein the second storage structure comprises an IDQ Bloom filter.

8. The apparatus of claim 1, wherein the reference to the code line comprises a virtual address of the code line.

9. The apparatus of claim 1, wherein the cache is a Level 2 (L2) cache.

10. The apparatus of claim 1, wherein the second storage structure is to store an indication of at least one of one or more instructions and one or more micro-operations that have been allocated in the IDQ.

11. The apparatus of claim 10, wherein the IDQ is to store at least one of an instruction and a micro-operation to be allocated in a pre-execution stage of a processor pipeline.

12. The apparatus of claim 1, wherein the code line is to store at least one of an instruction or a micro-operation.

13. The apparatus of claim 1, wherein a processor, having one or more processor cores, comprises one or more of: the logic circuitry, the first storage structure, and the second storage structure.

14. One or more non-transitory computer-readable media comprising one or more instructions that when executed on a processor configure the processor to perform one or more operations to cause:
a first storage structure to store a reference to a code line in response to a request to be received from a cache;
a second storage structure to store a reference to the code line in response to an update to an Instruction Dispatch Queue (IDQ); and
logic circuitry to control additional code line fetch operations based at least in part on a comparison of a number of ongoing speculative code fetches and a determination that the code line is speculative, wherein the code line is to be considered as speculative in response to one of: (a) a hit in the first storage structure for the code line and a miss in the second storage structure for the code line; and (b) a hit in the second storage structure for the code line and a miss in the first storage structure for the code line.

15. The one or more computer-readable media of claim 14, further comprising one or more instructions that when executed on the processor configure the processor to perform one or more operations to cause the logic circuitry to disallow the additional code line fetch operations based at least in part on a determination that the number of ongoing speculative code fetches has reached a threshold value and the determination that the code line is speculative.

16. The one or more computer-readable media of claim 15, further comprising one or more instructions that when executed on the processor configure the processor to perform one or more operations to cause the logic circuitry to allow the additional code line fetch operations based at least in part on a determination that the number of ongoing speculative code fetches has not reached a threshold value and the determination that the code line is speculative.

17. The one or more computer-readable media of claim 14, further comprising one or more instructions that when executed on the processor configure the processor to perform one or more operations to cause the logic circuitry to control the additional code line fetch operations for code lines that cause a miss in an instruction cache.

18. The one or more computer-readable media of claim 14, further comprising one or more instructions that when executed on the processor configure the processor to perform one or more operations to cause the logic circuitry to control the additional code line fetch operations based at least in part on the comparison of the number of ongoing speculative code fetches in a front end of a processor.

* * * * *